W. S. ARCHER.
Grain Drill.

No. 100,100.  Patented Feb. 22, 1870.

Witnesses:  Inventor:

UNITED STATES PATENT OFFICE.

WILLIAM S. ARCHER, OF DAYTON, OHIO.

IMPROVEMENT IN BROADCAST-SEEDERS.

Specification forming part of Letters Patent No. 100,100, dated February 22, 1870.

*To all whom it may concern:*

Be it known that I, WILLIAM S. ARCHER, of Dayton, in the county of Montgomery and State of Ohio, have invented an Improvement in Broadcast-Seeders, of which the following is a specification.

The first part of my invention relates to the arrangement of feeding-wheels of different capacities, the seed-box having an inside partition inclosing the outlet for the small wheel, and by which means different kinds of seeds may be sown simultaneously. This part also embraces the regulating of the flow of the seed by the relative position of the seed-box to the feeding-wheels.

The second part consists in attaching the feeding device to a horse-rake gearing from one wheel and using the rake-teeth to effect the covering of the seed.

Figure 1:
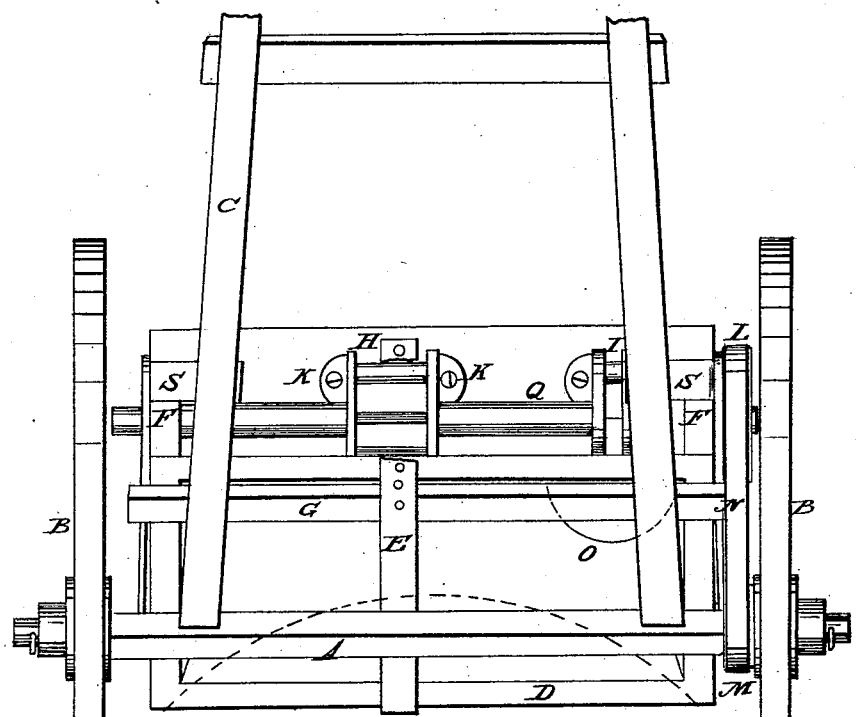
Figure 2:
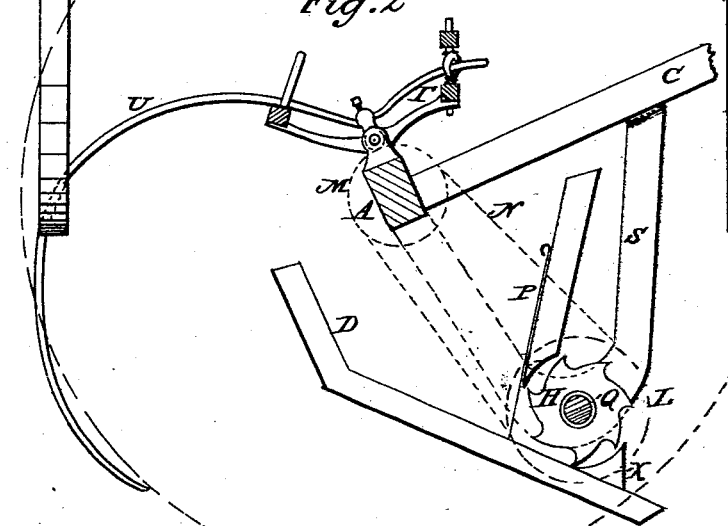

Figure 1, top view, with the front slightly elevated; Fig. 2, a sectional side view external to the shaft, with the tooth and its support, and a transverse section of the seed-box through the feeding-wheel.

Like letters occurring on the different figures refer to like parts.

A represents the axle, supported on wheels B B. To the axle are attached the shafts C in the usual manner. To the under side of the shaft is bolted the bar G, on the upper surface of which is secured a pin, which, entering the holes of the strap E, holds the seed-box in position. This strap is secured to the rear side of the seed-box. Other equivalent device may be substituted to adjust the seed-box.

Two arms, S S, bolted to the axle and the shafts, support the shaft Q, which turns freely within the supports. This shaft gives support to the seed-box by means of the bearings F, within which the shaft freely turns. To the end of this shaft is attached the pulley L, and to the hub of the wheel is attached a pulley, M. These pulleys are connected by the belt N, and through which motion is communicated from the wheels to the shaft carrying the feeding-wheels. A series of wheels alternating as to size, two of which are shown for illustration, are attached to the shaft by means of pins. These wheels are of the form shown at H, Fig. 2. The seed-box is cut away, as shown, for the wheel, which thereby is brought in contact with the seed in the box.

The opening through the box may be closed by the slide P.

A block, X, is secured in front of the wheel to prevent the passage of the grain through beneath the wheel.

In close proximity to the feeding-wheels, and on either side, are secured flanged plates K K, which rest against the box and the base-board. This board is extended beyond the wheels to distribute more evenly the seed that falls upon it from the wheels. A partition, O, is formed within the box and incloses the outlet to the small wheel I.

In the drawings, Fig. 1, parts are omitted which are not essential to illustrate the invention.

The seeding device may be attached to other forms of horse-rakes, as the rake-teeth are all that is necessary to use in connection with this device. At Fig. 2 is shown more clearly by lines and dots the arm S, which supports the shaft Q. In sowing timothy or clover seed the seed is placed within the partition. In sowing wheat the seed is put within the box. Clover-seed or timothy and wheat may be sown at the same time by raising the slide; if separately, and timothy or clover seed alone is sown, the slide must be closed.

The manner of regulating the flow of the seed is by moving the top of the box to and fro. If carried well forward, two of the cavities may be filled, or nearly so; if carried back so that the base-board approaches a horizontal position, but a very few seed would be carried over the wheel. Thus by the position of the seed-box the flow is readily regulated.

The use that the horse-rake subserves in its connection to the seeding device is to cover the seed by the rake-teeth stirring the soil.

In a practical machine the feeding-wheels are multiplied as desirable, the large and small wheels alternately, and the relation to the seed-box and partition is preserved.

I claim as my invention—

1. The feeding-wheels H and I, in their arrangement to the seed-box D, partition O, and with reference to each other, substantially as described, and for the purpose specified.

2. Pivoting the seed-box D on the shaft Q, for the purpose specified, and the manner of suspension from an axle by the arm S, substantially as described.

3. The strap E, or equivalent device, to adjust the feed-box with reference to the feeding-wheels, for the purpose specified.

4. The combination and arrangement of the several parts—viz., seed-box D, partition O, slide P, wheels H and I, shaft Q, arm S, pulleys M and L, and band N, in combination with a horse-rake, substantially as described.

WILLIAM S. ARCHER.

Witnesses:
 BARTON PICKERING,
 W. H. SIGMAN.